Dec. 16, 1958  H. E. FROEHLICH  2,864,569
CAPTIVE BALLOON
Filed May 20, 1955  2 Sheets-Sheet 1
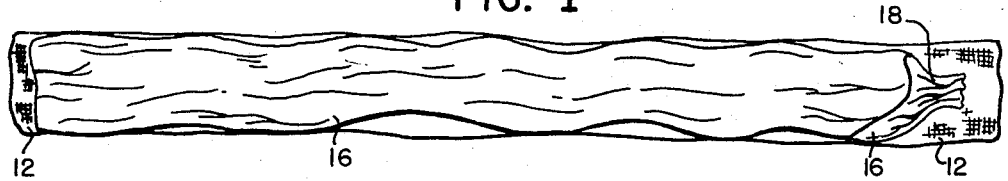
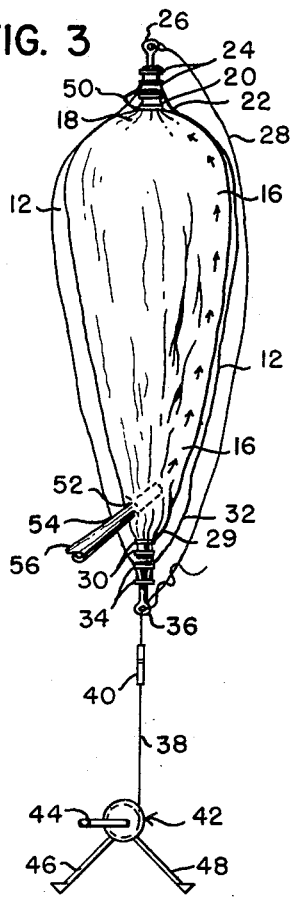
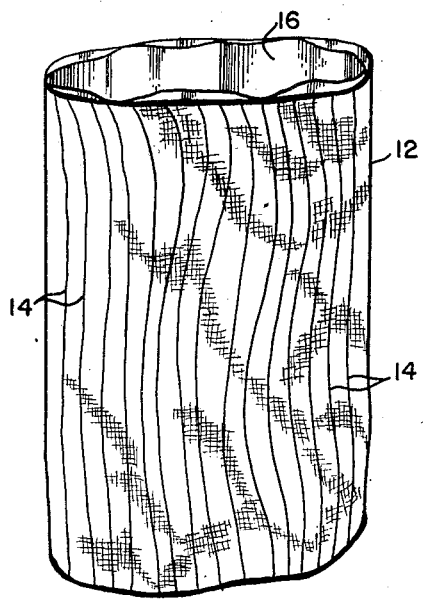
INVENTOR.
HAROLD E. FROEHLICH
BY
William C. Strueber
ATTORNEY Dec. 16, 1958    H. E. FROEHLICH    2,864,569
CAPTIVE BALLOON Filed May 20, 1955    2 Sheets-Sheet 2

INVENTOR.
HAROLD E. FROEHLICH
BY
William C. Stueber
ATTORNEY

United States Patent Office 2,864,569
Patented Dec. 16, 1958

2,864,569

CAPTIVE BALLOON

Harold E. Froehlich, New Brighton, Minn., assignor to General Mills, Inc., a corporation of Delaware Application May 20, 1955, Serial No. 509,807

8 Claims. (Cl. 244—33)

The present invention relates to improvements in captive balloons.

A free balloon is one which is capable of lifting a payload and ascending freely into the atmosphere with the load suspended beneath it. A captive balloon, however, is filled with a lifting gas and kept tied or tethered with a line so that its ascent is at all times under complete control and the line can be taken in to return the balloon to the ground. These basic differences between captive balloons and free balloons make it necessary to consider different factors in the design and structure of the balloon.

A free balloon is generally not structurally affected by the wind during flight since it floats along at the same speed as the air currents. Therefore the major consideration with respect to drag is in the vertical direction, and free fast rising balloons are designed to be streamlined so that their rate of rise will not be adversely affected by poor aerodynamic shape.

In a captive balloon, because it is tied and cannot move with the air currents, the lateral or horizontal winds are of prime consideration. Because of the effect of the winds, it is always necessary to design the captive balloon so that it will have a minimum drag coefficient in a horizontal direction and captive balloons usually have been built with a streamlined shape and made rigid such as by pressurizing so that the force of the wind will not distort the balloon and increase its drag. Excessive resistance to winds by the captive balloon will prevent it from rising to any useful height and the winds will force the balloon horizontally against its captive mooring and drive it toward the ground. With the present-day use of stronger and lighter weight captive guy lines and the use of new lightweight plastic balloon materials, it has been possible to send captive balloons higher and higher into the atmosphere. This, of course, permits the balloon to ascend into atmospheres where moderate winds may be encountered and increases the importance of designing the balloon so that it will have minimum drag.

Balloons which have heretofore been designed with optimum aerodynamic shape with a minimum of wind resistance have been expensive. One of the prime disadvantages is associated with the fact that a lightweight balloon must of necessity be pressurized to maintain its shape. When the captive balloon is left aloft over a period of time, changes in temperatures cause the gas to contract and the pressurized balloon becomes soft and flabby and wrinkles and dimples are formed, thereby greatly increasing the drag. Attempts to maintain a constant pressure in the balloon require expensive fabrication or airborne inflation equipment, which add to the weight of the balloon, and make it more cumbersome to use. An elastic balloon will remain pressurized but is unsatisfactory in many respects since it will deform in high winds and the material used is generally harmed by exposure to the elements, thereby making non-elastic or non-extensible material more satisfactory.

It is accordingly an object of the present invention to provide a very stable captive balloon which automatically remains pressurized during changes in temperature and consequent changes in gas volume without the necessity of providing expensive auxiliary pressurizing equipment, the balloon thereby retaining its aerodynamic shape, enabling it to continue floating without excessive interference from the wind.

Another object of the invention is to provide a pressurized captive balloon which is capable of constant and long use and which can be easily and simply manufactured with a minimum of time of manufacture and reduced cost of materials.

Another object of the invention is to provide a captive balloon of improved design which is very durable and is capable of long periods of use without excessive gas leakage and yet which is extremely lightweight so as to be able to obtain very high altitudes.

Other objects and advantages become more apparent in the following specification taken in connection with the accompanying drawings, in which:

Figure 1 is a side elevational view of the deflated balloon envelope with the outer cover broken away to illustrate the position of the inner liner within the balloon;

Fig. 2 is a perspective view of the top end of the balloon envelope illustrating the relative circumferential sizes of the outer cover and the inner liner;

Fig. 3 is a side elevational view illustrating the balloon during inflation with the outer cover broken away to show the position of the liner.

Figure 4:
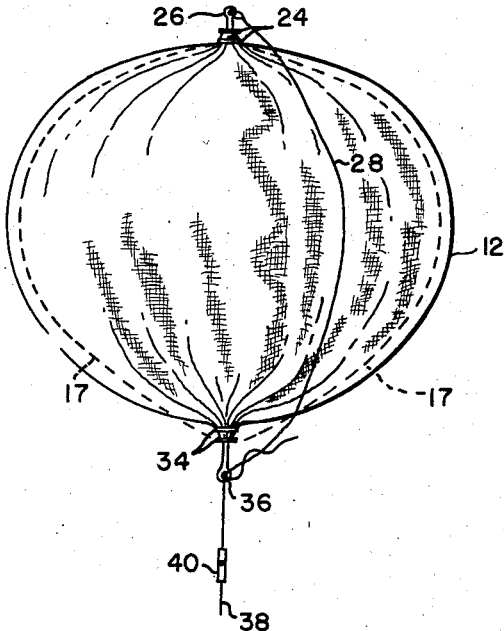
Fig. 4 is a side elevational view illustrating the appearance of the balloon when it is fully inflated and floating aloft, held at its floating altitude by the captive line.

The primary foe of captive balloons is the strong winds which must be encountered as a captive balloon is floating aloft. The captive line is payed out a distance which will permit the balloon to float at the desired altitude. There is an obvious advantage in maintaining the balloon at that altitude with varying winds and if the drag of the balloon is excessive, rising winds will tend to force the balloon laterally against its mooring to a point where it is forced down toward the ground and it thereby loses its effectiveness as a high altitude captive balloon. With the use of new lightweight thermoplastic materials such as polyethylene, heretofore unobtainable balloon altitudes have been achieved. Lightweight materials such as nylon for the captive lines have contributed to obtaining these new altitudes, since one of the limiting factors of altitude has been the weight of the captive line which must be taken aloft and supported by the captive balloon.

Captive balloons heretofore have been designed to aerodynamic streamlined shapes to reduce the balloon drag. This has been accomplished by expensive tailored designs. In spite of the expensive construction of these designs, they were effective only as long as the balloon was pressurized since, as soon as the pressure dropped and the skin tension of the balloon material was reduced, the balloon became flabby, lost its ideal shape, and tended to dimple or have wrinkles. Since cooling of the lifting gas in a balloon will always take place at nightfall with the setting of the sun, these captive balloons lost their pressure and therefore were effective only for short duration flights or had to be provided with complicated pressurizing devices which would maintain the pressure within the balloon such as by generating additional gas to replace the volume lost by the cooling of the lifting gas within the balloon.

In the present invention as illustrated in the preferred embodiment of the drawing, a balloon is provided which is capable of automatically retaining its pressurized condition even over large changes in volume such as occur at sunset. Further, in addition to this capability of retaining its pressurized condition, the balloon is extremely simple to manufacture and is considerably less in cost due both to reduced manufacturing time and reduced material cost, than designs heretofore used.

The balloon envelope basically is formed of a length of cylindrically shaped non-extensive material. The balloon envelope is completed from this length of cylindrical material by gathering together the ends of the material and securing the ends in their gathered condition. The balloon envelope is then uprighted and inflated through an opening in the bottom to somewhere near its maximum volume. With this design of envelope the balloon will become pressurized during inflation before it reaches maximum volume and the inflation is then continued to bring it to maximum volume. The envelope then is completely sealed and the captive line is secured to the lower gathered end of the balloon envelope. This provides a balloon which will retain its skin tension even though the volume of the gas within the envelope contracts to a much smaller volume. Further, the envelope will maintain its shape which will not offer excessive drag in the winds.

As shown in Fig. 1 the balloon envelope is preferably formed of two layers with an inner liner 16 and an outer cover or shroud 12 being provided. The inner liner is basically of a gas-retaining material, whereas the outer cover is a protective cover which helps to strengthen the liner material so that it can be pressurized and which also protects the liner against tears which might occur when accidentally rubber against an abrasive substance such as might happen when the balloon is brought to the ground.

The outer cover 12 of the balloon as shown in Figs. 1 and 2 is formed of nylon, Orlon, or similar material which is very lightweight and yet is extremely strong and tough having a high tensile strength. The cover is cylindrically shaped, being formed of a series of long rectangular strips or gores 14 which are sewed together at their adjoining edges to complete the cylindrical outer cover of the balloon envelope.

Within the outer cover is the balloon liner or bladder 16 which is also cylindrical in shape. This liner is formed of a thin lightweight gas-retaining plastic material such as polyethylene. The polyethylene may also be formed of a series of rectangular strips or gores which are joined to each other along their edges by heat sealing, or it may be formed of a continuous length of cylindrical plastic material.

To complete the balloon envelope, the ends of the cylindrical liner 16 and the cylindrical cover 12 are gathered together and clamped in the gathered condition. In Fig. 1 the upper end 18 of the cylindrical liner is illustrated as it is gathered together. The end is held in its gathered condition by a suitable clamp 20 as shown in Fig. 3. The clamp may be formed of a band or line tied tightly around the end of the balloon or may be a mechanical clamp with a single ring or with a plurality of rings. Clamping members which are drawn together by a threaded member to cause the members to force the material against a holding ring may be used satisfactorily but since the clamping apparatus is not restricted to any one type, the apparatus is not shown in detail.

As is illustrated in Fig. 2, it is preferred that the inner liner material 16 of the balloon have a circumference slightly greater than the outer cover 12 so that as the liner is inflated, it may be forced against the outer cover without having to be stretched. Also, if the inner liner is accidentally not properly positioned it can be forced against the outer cover during inflation without having wrinkles in some locations and having excessive stretch in other locations.

Referring to Fig. 3, the balloon envelope is illustrated as having been completed and being inflated. The upper end of the liner as previously described has been gathered and is clamped by clamping member 20. The outer cover member 12 has also been gathered at its upper end 22, and the gathered upper end is held together by a clamp 24. The clamping member 24 is provided with an eye bolt 26 to which the ground anchoring line 28 is connected for use in a manner which will later be described in detail.

The lower end 29 of the balloon liner 16 is also gathered together and held in its gathered condition by a clamp 30. It will be noted that the balloon liner is substantially the same length as the outer cover 12 so that it may be inflated against the outer cover without having to stretch. The lower end 32 of the outer cover is gathered together in the same manner as was the upper end and the clamp 34 is applied to hold the gathered material together.

The clamp 34 is provided with an eye 36 which serves to anchor the balloon and hold it captive by means of the captive line 38 which is secured through the eye. The captive line 38 is provided with a swivel 40 which permits the balloon to twist and turn without twisting the lower end of the captive line. The captive line at its lower end is wound around a winch 42 which is powered such as by handle 44 to crank the balloon in or let it out to rise to its floating altitude. The winch may assume various designs but is shown diagrammatically with legs 46 and 48 to anchor the winch to the ground.

It may be noted in Fig. 3 that the upper end 18 of the liner is tied, such as by a short length of line 50, to the upper end 22 of the cover. This prevents the liner from becoming displaced with respect to the cover during the early stages of inflation and especially prevents the liner from dropping down within the cover member when the balloon first floats to a vertical position as it is being inflated.

For inflation, a small opening or slit 52 is provided or may be cut in the side of the lower end of the liner 16. A corresponding opening 54 is cut through the cover 12 so that a gas inflation tube 56 may be inserted through the openings to inflate the balloon.

When the inflation tube is inserted, the balloon is inflated to a point where it becomes pressurized. Inflation is then continued until the balloon reaches maximum volume or to the point wherein it will have maximum volume when the gas is fully expanded at floating altitude. This point may be determined from the temperature of the gas which is inflated into the balloon, the temperature it will reach when exposed to sunlight, and the atmospheric pressure at the altitude at which the balloon is to float. The amount of gas in the balloon must be such that it will expand to bring the balloon to its maximum volume as illustrated in Fig. 4, at the maximum temperature that the gas will reach when exposed to sunlight, and at the atmospheric pressure at which the balloon will float when let out to its floating altitude.

The condition of the balloon at floating altitude is illustrated in Fig. 4 where the balloon fills out to be somewhat onion-shaped. The balloon at this point is pressurized and as such maintains a skin tension on the material so that it will not dimple or wrinkle to increase the aerodynamic drag. The fully rounded shape is well suited to have a low drag to the wind and this shape will be retained since the gas within the balloon will remain under pressure.

If the balloon is to be maintained at its floating altitude over a longer period of time, it will have to pass through a number of sunsets and sunrises. As the temperature falls at sunset, the gas within the balloon contracts and the balloon decreases in volume. This effect on the balloon is illustrated by dotted line position 17 in Fig. 4 where the volume has decreased. It is of paramount importance, however, that the balloon still retain an internal pressure with this change in volume and with the present balloon the internal pressure will remain over a range of volumes even though the balloon is formed of non-elastic or non-extensible material. As thus pressurized, the balloon will not dimple or wrinkle and will still retain its aerodynamic shape so as not to create excessive resistance to the wind. Thus a shape and a design have been provided which can change considerably in volume without losing internal pressure and it has been unnecessary to provide additional equipment which will maintain the internal pressure of the balloon.

An example of a balloon which has been flown in accordance with the present principles had the following dimensions and properties:

Outer cover:
- Gore length _____ feet__ 74½
- Individual gore width _____ do____ 3
- Number of gores _____ 51
- Circumference _____ feet__ 154
- Cover material _____ Nylon
- Gores sewn together.

Liner:
- Material _____ 2 mil polyethylene.
- Gore width _____ 9 feet.
- Number of gores _____ 18.
- Circumference _____ 162 feet.
- Gores heat sealed together.

Weights: Pounds
- Cover _____ 345
- Liner _____ 145
- End fittings _____ 15
- Total _____ 505
- Balloon lift _____ 3300

Pressure and volume range for pressurized condition: Cu. ft.
- Minimum volume_____ 58,000
- Maximum volume_____ 62,500

For the range of volumes given the balloon pressures will range from about 2 inches of water to approaching zero pressure at the bottom end of the balloon. The pressures will of course be higher nearer the balloon top and at these pressures the balloon material will remain taut and the balloon will not lose its shape to create undue wind resistance. For the higher pressure winds of approximately 55 miles per hour can be withstood without dimpling the balloon.

If a stronger nylon or Orlon cover is used, a higher internal pressure can be maintained. With 6 oz. Orlon having a strength of 300 pounds per square inch, internal pressures of 11 inches of water can be used. Theoretically, a 147 mile per hour wind will be necessary to dimple this balloon.

From the above balloon specifications, it is important to note that the volume may drop 4500 cubic feet due to cooling of gas. It is over this range that the balloon will remain pressurized and this pressurized condition will remain with the use of non-extensible material. Thus it will be seen that the gas may cool considerably to drop in volume from 62,500 cubic feet to 58,000 cubic feet. Yet over this cooling range, the balloon will retain pressurization, thus maintaining a taut surface which will not wrinkle or dimple to cause wind resistance.

It will also be noted from the above figures that a very lightweight balloon is used and its weight lifting capabilities are extremely high. With a high lift and low wind drag, captive balloon altitudes can be reached which are far in excess of those heretofore obtainable.

The balloon as illustrated is formed of two layers of material. It will readily be seen that one layer could be used by utilizing a material which would be capable of retaining gas and have sufficient strength to maintain internal pressure. The balloon envelope need only be cylindrical in shape and have a sufficient circumference with respect to the length so that the bubble of gas can assume its natural shape within the balloon. This makes a large range of designs available and makes it possible to design a balloon without critical dimensions, thereby obviously saving much time and money. It also will be obvious that using a length of cylindrical material is much less expensive than tailoring the balloon to a precise aerodynamic shape.

The shape the present captive balloon will assume in flight depends on many factors such as fabric weight, fabric distribution, internal pressure, gross lift, wind velocity.

For zero pressure at the balloon base for zero wind velocity, the shape can be approximated by the following equation:

$$X = 1.45(.6 + W_f)[Y^3 - Y^{2(1+W_f)}]$$

where:

$$W_f = \frac{W_b}{A \times Y_{\max \text{ delta}}}$$

and:

$A$ = surface area of the balloon
$W_b$ = weight of the balloon envelope
delta = unit lift of the gas
$Y_{\max}$ = the balloon height measured from the top of the balloon
$X$ and $Y$ = the coordinates defining the shape of the balloon For increasing internal pressures the shape becomes more oblate or fatter than in the formula above which is for zero pressure at the base and in the infinite internal pressure case, the shape is that of a double elastica or "onion-shaped." For intermediate pressures, the shape is between these extremes.

It has been theoretically determined that the volume will vary with this shape from 1 to 1.3 units. This variation is more than enough to overcome sunset or sunrise temperature effects, therefore giving a variable volume balloon capable of remaining tight over wide temperature ranges.

In general, it is desirable to maintain an internal pressure great enough so that distortion of the balloon will not occur in high wind velocities. For instance, it can be shown from the standard aerodynamic drag equation that two inches of water internal pressure will prevent distortion in wind of approximately 55 miles per hour at sea level. At higher altitudes the internal pressure requirement is less for the same wind velocity. This is due to the reduction in air density with altitude.

Although a range of sizes is available, it is preferred that the balloon be constructed according to the following principles and dimensional formulae.

To fabricate such a balloon the following relationships have been found to apply:

$$\text{Vol.} = .15 L^3$$
$$R = .36 L$$

where:

Vol. = the volume of the balloon
$R$ = the radius of the balloon (for large internal pressures)
$L$ = length of the balloon from the top around the balloon to the bottom It is convenient to fabricate such a balloon from rectangular gores of material of length L and width W such that $NW = 2\pi R$ where $N$ = the number of gores.

To save weight it is possible to taper the gore ends such that there is just enough fabric to let the balloon take the shape as defined by the previous equation and carry the fabric stresses involved.

The fabric stresses in such a balloon are very low in the circumferential direction and are determined in the other direction by cutting an artificial horizontal plane through the balloon and balancing all the forces involved. This procedure can establish the amount of tailoring that can be done on each gore. To balance the forces the total vertical force is determined from the net lift taking into consideration the lift of the gas and weight of material at the plane and then computing tensile stress taking into consideration the angle of the balloon material at the plane with respect to the vertical forces.

The ground anchor line is tied through the eye bolt 26 at the top of the balloon and during flight the other end is tied to the eye 36 at the bottom of the balloon. The purpose of this line is to bring the balloon to a horizontal position where it is protected against the wind during the times when the balloon is not aloft.

Figure 5:
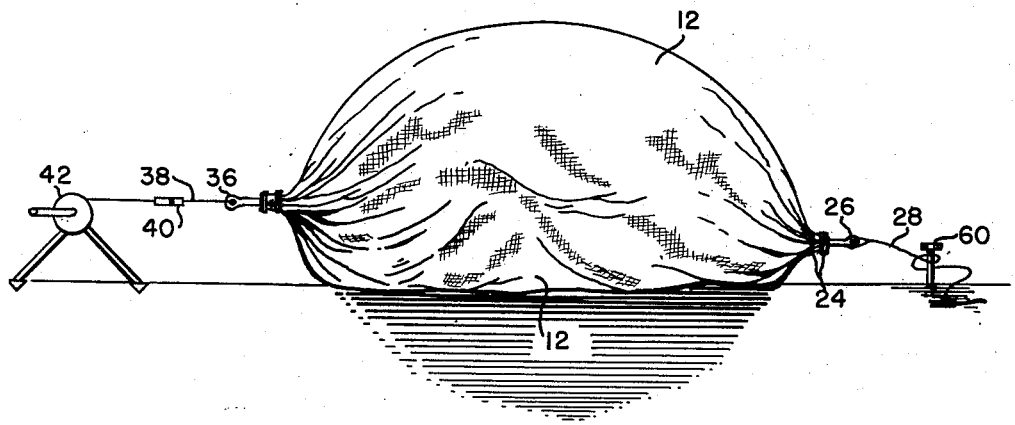
Fig. 5 is a perspective view of an inflated balloon shown as it is anchored to the ground when not in use so as to be protected from the winds.

The balloon is first brought to the earth by drawing in the captive line 38 by means of the winch 42. When the balloon approaches the ground, the free end of the anchor line 28 is loosened and the balloon is pulled over to its horizontal position as illustrated in Fig. 5. The anchor line 28 is then secured to an anchor post 60 to hold the balloon against the ground with its lower side in flattened engagement with the ground. Since the balloon is secured between the anchor line 28 and the captive line 38, it will remain against the ground and with the bubble of gas within the balloon body extending upwardly, the balloon presents a rounded surface to the wind. It is preferred that the winch 42 in Fig. 5 be upwind or at least the balloon axis be parallel to the wind direction so that the wind will blow parallel to the balloon axis which tends to make a more secure anchor.

When the wind has subsided and the balloon is again to be flown, the anchor line 28 is released to permit the balloon to again move to the upright position. The anchor line is then secured to the eye 36 at the bottom of the balloon and the balloon is let out by unrolling the winch 42.

Thus it will be seen that a balloon has been provided which is notably simple in design and which can be manufactured in a minimum of time. Both the cover material and the liner material may be formed of tubular material which obviates the need for critical tailoring and reduces the waste of material. The tubular lengths are merely gathered together at their ends and clamped and the balloon is completed.

The inner liner material provides a lightweight effective barrier for the gas and the outer material, while also being lightweight, has a high tensile strength which enables pressurizing of the balloon. The balloon is easily inflated and the inflation holes can be readily patched in the liner material by heat sealing the polyethylene and sewing the slit together in the cover.

In spite of the very simple design of the balloon, it achieves the unusual advantage of remaining pressurized over a considerable range of volume so that it will retain its skin tension during cooling and heating of the lifting gas. This defeats the effect of the wind which tends to dimple and wrinkle an unpressurized balloon, and with the pressurized shape of the balloon, the balloon may be sent aloft over a period of days. It will retain its altitude without additional attention.

I have, in the drawings and specification, presented a detailed disclosure of the preferred embodiments of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A captive balloon assembly comprising a balloon envelope including an outer cover member and a liner, the liner member being formed of a material capable of holding a lifting gas and the outer cover member being of relatively high tensile strength to lend strength to the liner member when the balloon is filled with gas and pressurized, the liner and cover member each being substantially tubular in shape with their ends open but individually gathered together to close the liner and the cover member, separate clamping means for each end of the liner to clamp the gathered ends together and separate clamping means to clamp the gathered ends of the cover member, a captive line connected to the lower end of the balloon envelope to tether it to the ground and control its height of ascent, and an opening in the lower end of the balloon above the clamping means for the lower gathered end, said opening extending through the cover member and the liner to provide an opening for inflating the balloon.

2. A captive balloon assembly comprising an inner liner member for a balloon envelope being substantially cylindrical in shape and having the free ends gathered together to close the liner, an outer cover member also being substantially tubular in shape and surrounding the liner with its free ends open but gathered together to close the liner, the cover member being formed of a lightweight tough high tensile strength material to withstand pressure of the gas when the balloon is inflated and the liner member being formed of material capable of containing a lifting gas, and clamping means for each end of the liner member and each end of the cover member, the circumferential length of the cylindrical inner liner being greater than the cover member so that the liner will not be placed under tensile strength as it is inflated with gas and forced against the outer cover member.

3. A captive balloon having a balloon envelope which is cylindrical in shape with the ends of the cylinder gathered together and secured, means for attaching a captive line to the lower end of the balloon, and the balloon envelope having dimensions substantially in accordance with the following formula:

$$V = .15L^3$$
$$R = .36L$$

where:

$V$ = the volume of the balloon
$R$ = the radius of the balloon
$L$ = the length of the balloon from the top around the the balloon to the bottom.

4. A captive balloon having a balloon envelope formed of a length of tubular material with the ends gathered and secured, and means for connecting a captive line to the lower end of the balloon, the balloon envelope having dimensions of length and circumference so that for zero pressure at the balloon base the inflated shape may be substantially defined by the following equation:

$$X = 1.45 \, (.6 + W_f) \, [Y^3 - Y^{2(1+W_f)}]$$

where $$W_f = \frac{W_b}{A \times Y_{\text{max}} \, \text{delta}}$$

and $A$ = the surface area of the balloon
$W_b$ = the weight of the balloon envelope
delta = the unit lift of the gas
$Y_{\text{max}}$ = the balloon height measured from the top of the balloon
$X$ and $Y$ = the coordinates defining the shape of the balloon.

5. The method of inflating a captive balloon having an envelope with an inner liner and a separate outer liner each formed of tubular material gathered together and clamped at the ends which comprises attaching the upper end of the liner to the upper end of the cover to hold it in place and prevent it from dropping down in the liner during the early stages of inflation, inflating the balloon with a lifting gas through an opening in the side of the balloon through the liner and outer cover adjacent the lower end of the envelope, and sealing the opening to seal the balloon.

6. The method of protecting a captive balloon in high winds which comprises taking in the captive line to bring the balloon to the ground, drawing the upper end of the balloon toward the ground and anchoring it to the ground a distance from the lower end substantially equal to the length of the balloon so that the side of the balloon is in direct engagement with the ground and flattened thereagainst to present an upwardly extending rounded surface of the balloon body to thereby slightly increase the pressure within the balloon and present a streamlined surface to the wind.

7. A captive balloon constructed in accordance with claim 3 in which the balloon envelope comprises a plurality of rectangular gores of material secured together at their adjoining edges, the gores having a length L and a width W such that $NW=2\pi R$, where $N=$ the number of gores.

8. A captive balloon having an envelope formed of lightweight material capable of retaining the lifting gas with the envelope formed of a series of rectangular shaped gores which are attached to each other at their adjoining edges and tapered at at least their lowered end but with sufficient material remaining to withstand the vertical stresses caused by the forces on the balloon envelope, the envelope closed by the ends being gathered together, means at each end of the envelope to clamp the gathered ends, and means at the lower end of the envelope to secure a captive balloon line.

References Cited in the file of this patent

UNITED STATES PATENTS

| | | |
|---|---|---|
| 1,275,710 | Lewis | Aug. 13, 1918 |
| 1,385,972 | Upson | July 26, 1921 |
| 1,619,565 | Chvojka | Mar. 1, 1927 |
| 2,455,248 | Hagen | Nov. 30, 1948 |

OTHER REFERENCES

Free and Captive Balloons, Upson and Chandler, The Ronald Press Company, New York, 1926.

Military Observation Balloons, Emil J. Widmer, D. Van Nostrand Co., New York, 1918.